(12) United States Patent
Smith et al.

(10) Patent No.: US 9,661,484 B2
(45) Date of Patent: *May 23, 2017

(54) METHOD OF CONVEYING A LOCATION INFORMATION REPRESENTING A PHYSICAL LOCATION OF A COMMUNICATION DEVICE, A COMPUTER PROGRAM PRODUCT FOR EXECUTING THE METHOD, AND THE COMMUNICATION DEVICE FOR CONVEYING THE LOCATION INFORMATION

(71) Applicant: Unify GmbH & Co. KG, Munich (DE)

(72) Inventors: James Smith, Nottingham (GB); Thomas Scharnagl, Perchtoldsdorf (AT); Karl Klaghofer, Munich (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/383,140

(22) Filed: Dec. 19, 2016

(65) Prior Publication Data
US 2017/0105107 A1    Apr. 13, 2017

Related U.S. Application Data

(63) Continuation of application No. 15/204,267, filed on Jul. 7, 2016, now Pat. No. 9,560,511, which is a
(Continued)

(30) Foreign Application Priority Data

Jul. 18, 2012 (WO) .................. PCT/EP2012/003035
Jul. 25, 2012 (WO) .................. PCT/EP2012/003148

(51) Int. Cl.
*H04W 24/00* (2009.01)
*H04W 4/22* (2009.01)
(Continued)

(52) U.S. Cl.
CPC ............. *H04W 4/22* (2013.01); *G01S 5/0252* (2013.01); *H04L 65/1006* (2013.01);
(Continued)

(58) Field of Classification Search
CPC ......... H04W 4/22; H04W 4/027; H04W 4/20; H04W 76/007; H04L 65/1006;
(Continued)

(56) References Cited

U.S. PATENT DOCUMENTS 7,929,976 B1     4/2011  Appelman
2004/0121765 A1*  6/2004  Idnani ............... H04L 29/06027
                                                        455/422.1
(Continued)

FOREIGN PATENT DOCUMENTS

EP         2063677 A1    5/2009

OTHER PUBLICATIONS

Written Opinion of the International Searching Authority for PCT/EP2012/003543 dated Aug. 5, 2013.
(Continued)

*Primary Examiner* — Mahendra Patel
(74) *Attorney, Agent, or Firm* — Buchanan Ingersoll & Rooney PC

(57) ABSTRACT

A method of conveying a location information representing a physical location of a communication device to another communication device comprises acquiring by the communication device a first location information and a second location information, the second location information being acquired subsequently to the acquiring of the first location information and detecting by the communication device a deviation of the second location information from the first location information representing a change of the physical location of the communication device. The method further comprises, triggered by the detected change of the physical
(Continued)

location of the communication device, conveying the most recently acquired physical location of the communication device to the other communication device by sending a signaling message by the communication device to the other communication device, the signaling message comprising either the second location information or the deviation of the second location information on the first location information.

20 Claims, 6 Drawing Sheets

Related U.S. Application Data continuation of application No. 14/378,858, filed as application No. PCT/EP2012/003543 on Aug. 21, 2012, now Pat. No. 9,417,313.

(51) Int. Cl.
| | |
|---|---|
| *H04L 29/06* | (2006.01) |
| *H04W 4/02* | (2009.01) |
| *H04W 4/20* | (2009.01) |
| *H04W 76/00* | (2009.01) |
| *G01S 5/02* | (2010.01) |

(52) U.S. Cl.
CPC ...... *H04L 65/1069* (2013.01); *H04L 65/1073* (2013.01); *H04L 65/1083* (2013.01); *H04W 4/027* (2013.01); *H04W 4/028* (2013.01); *H04W 4/20* (2013.01); *H04W 76/007* (2013.01)

(58) Field of Classification Search
CPC ............. H04L 65/1073; H04L 65/1083; H04L 29/12584; H04L 61/3095; H04L 61/2596; G01S 5/0252
USPC ........................................................ 455/456.1
See application file for complete search history.

(56) References Cited

U.S. PATENT DOCUMENTS

| | | | |
|---|---|---|---|
| 2006/0126601 | A1 | 6/2006 | Kim et al. |
| 2008/0126535 | A1* | 5/2008 | Zhu ................... H04W 64/003 709/224 |
| 2008/0317008 | A1 | 12/2008 | Forte-McRobbie et al. |
| 2009/0024312 | A1* | 1/2009 | Brinkman .............. G01C 21/20 701/532 |
| 2009/0215427 | A1* | 8/2009 | Hawkins .............. H04M 3/5116 455/404.2 |
| 2009/0315767 | A1 | 12/2009 | Scalisi et al. |
| 2010/0161184 | A1* | 6/2010 | Marathe ................ E02F 9/2217 701/50 |
| 2010/0248683 | A1* | 9/2010 | Terpstra ............ H04M 3/42059 455/404.2 |
| 2010/0293289 | A1 | 11/2010 | Hsu et al. |
| 2011/0216763 | A1* | 9/2011 | Wahl ................. H04L 29/12896 370/352 |
| 2012/0040681 | A1* | 2/2012 | Yan ........................ H04W 4/02 455/440 |
| 2013/0069828 | A1* | 3/2013 | Cheng .............. H04W 74/0891 342/458 |
| 2015/0080016 | A1* | 3/2015 | Smith ................ H04L 65/1006 455/456.1 |

OTHER PUBLICATIONS

International Search Report for PCT/EP2012/003543 dated Aug. 5, 2013.
International Preliminary Report on Patentability for PCT/EP2012/003543 dated Aug. 21, 2012.
James Polk Cisco Systems, "Session Initiation Protocol (SIP) Location Get Function" Internet Engineering Task Force, IETF; (ISOC), Jul. 7, 2008.
Mahy Individual B. Rosen Neustar H Tschofening, Nokia Siemens Networks R, "Filtering Location Notifications in the Session Initiation Protocol (SIP)" Internet Engineering Task Force, IETF, Standard, Internet Society (ISOC), pp. 1-19, sections 1 and 3, Jan. 27, 2012.
Polk Cisco Systems B. Rosen J. Peterson Neustar J, "Location Conveyance for the Session Initiation Protocol" Internet Engineering Task Force, IETF, Standard Internet Society (ISOC), pp. 1-35, Dec. 3, 2011.

* cited by examiner

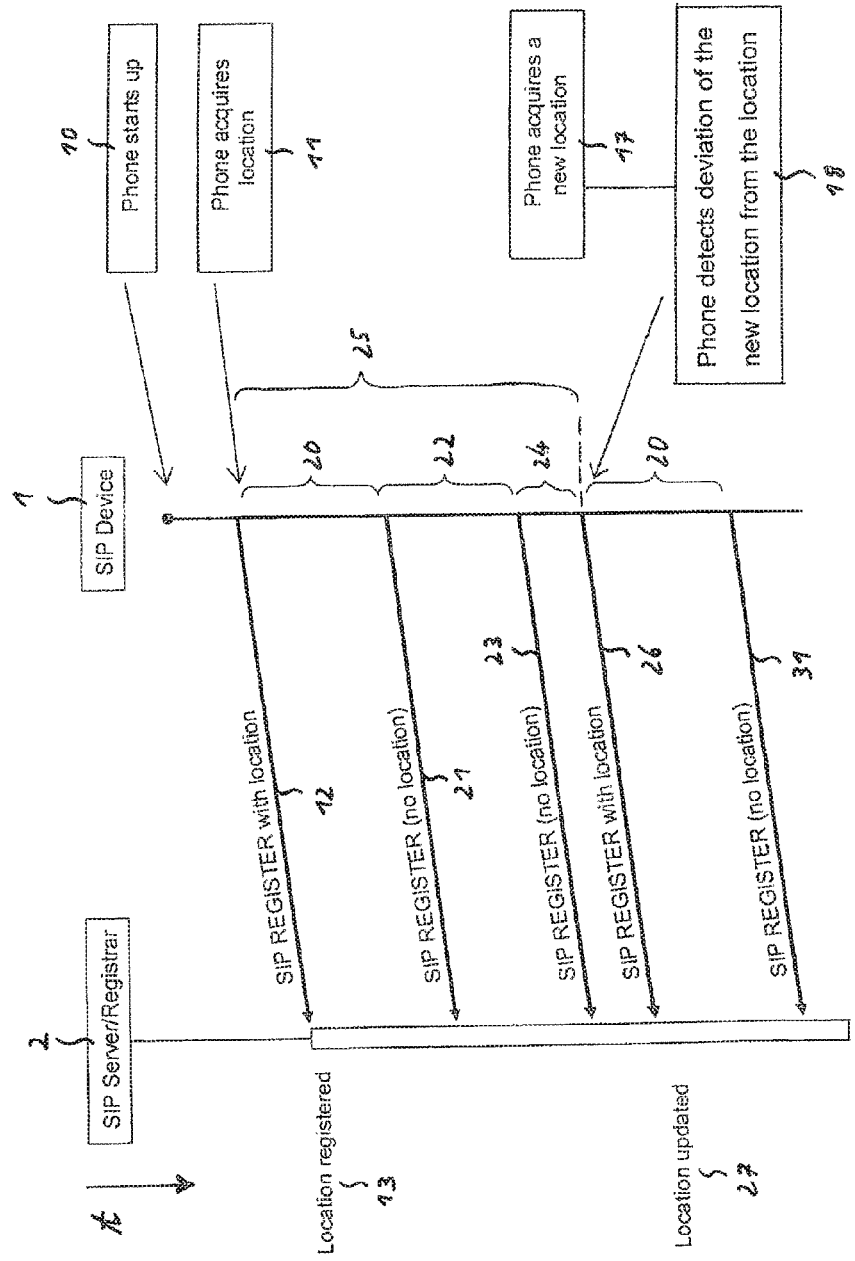

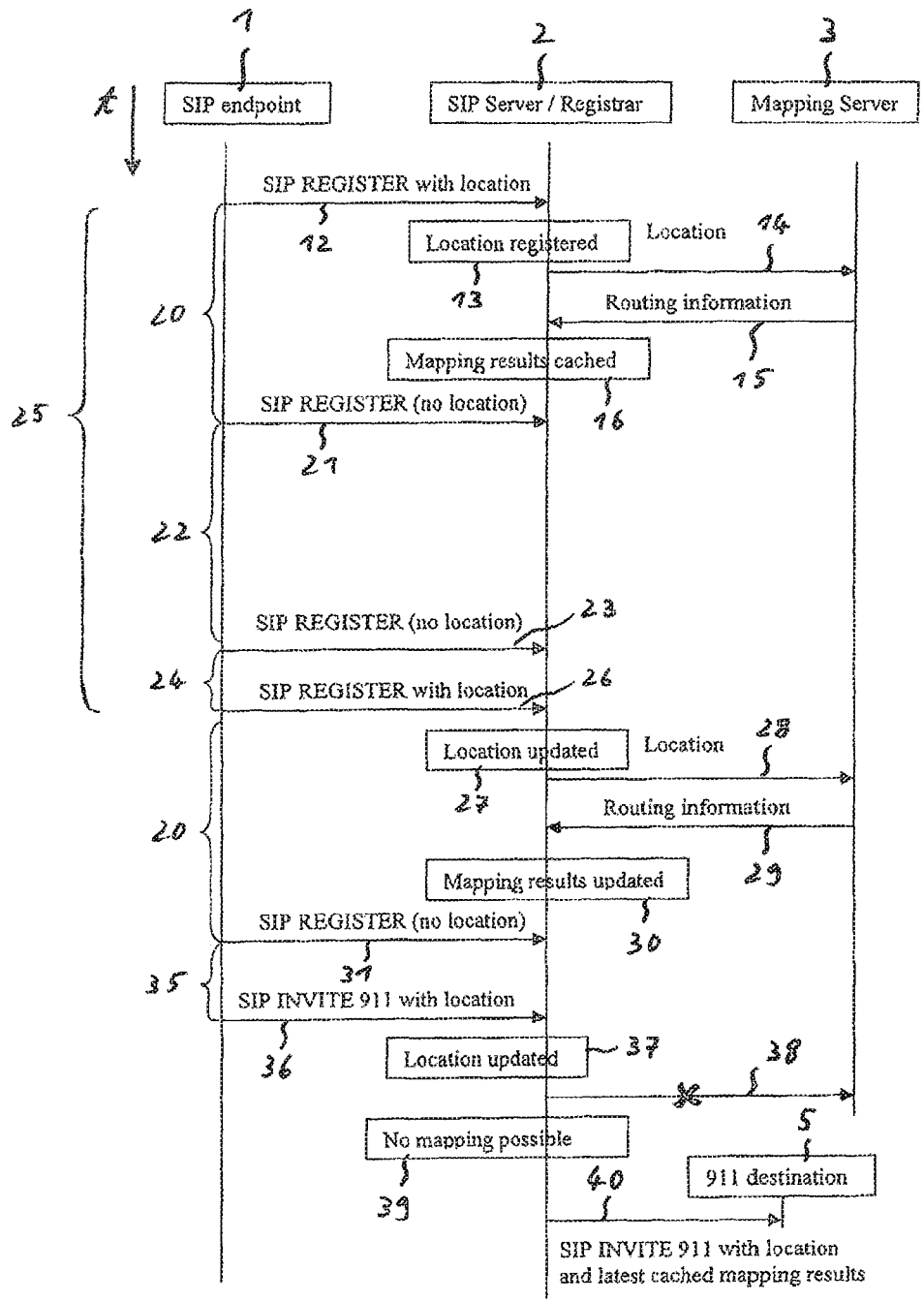

FIG. 3a

| Transport | Direction | Area | Speed | Altitude | Location updates triggered by |
|---|---|---|---|---|---|
| Commercial plane 50 | Mostly constant 51 | Any 52 | Fast >200mph 53 | High >1000ft 54 | • Change of direction 55<br>• Drop in altitude > 10% 56<br>• Periodic > 1hr. 57<br>• Changed position >500 miles 58 |
| Private plane 60 | Mostly constant | Any | Medium <200mph | Medium >500ft above terrain | • Change of direction<br>• Drop in altitude > 10%<br>• Periodic > 15mins<br>• Changed position >30 miles |
| Ship 70 | Mostly constant | Water | Moderate >15mph | ~0 | • Change of direction<br>• Change of speed > 50% 71<br>• Periodic > 1hr<br>• Changed position >20 miles |
| Sail boat 80 | Variable | Water | Moderate <35mph | ~0 | • Periodic >10mins<br>• Changed position >5 miles 87 |
| Motor boat 90 | Variable | Water | Medium <90mph | ~0 | • Periodic >5mins<br>• Change of speed > 50%<br>• Changed position >5 miles |

FIG. 3b

| Transport 41 | Direction 43 | Data analysed from location information | | | Location updates triggered by 47 |
|---|---|---|---|---|---|
| | | Area 44 | Speed 45 | Altitude 42 46 | |
| Canal/lake boat 100 | Variable | Land | Slow <10mph | Ground level | • Periodic >20mins<br>• Change of speed > 50%<br>• Changed position >.5 miles |
| Train 110 | Variable | Land | Medium <200mph | Ground level ±100ft | • Periodic >5mins<br>• Change of speed > 50%<br>• Changed position >5 miles |
| Coach 120 | Variable | Land | Moderate <100mph | Ground level ±100ft | • Maintained change of direction<br>• Periodic >5mins<br>• Change of speed > 50%<br>• Changed position >5 miles |
| Bus 130 | Variable | Land | Slow <60mph | Ground level ±50ft | • Periodic >5mins<br>• Change of speed > 50%<br>• Changed position >5 miles |
| Car/Motor bike 140 | Variable | Land | Moderate <150mph | Ground level ±100ft | • Maintained change of direction<br>• Periodic >1mins<br>• Change of speed > 50%<br>• Changed position >2 miles |
| Bicycle 150 | Variable | Land | Slow <30mph | Ground level ±100ft | • Maintained change of direction<br>• Periodic >1mins<br>• Change of speed > 50%<br>• Changed position >.5 miles |
| Walking 160 | Variable | Land | Slow <10mph | Ground level ±3000ft | • Periodic >1mins<br>• Changed position >1 mile |

FIG. 5

```
REGISTER
...
Geolocation: cid:my-office@enterprise.com
Geolocation-Routing: no
...
Content-type: application/pidf+xml
Content-ID: <my-office@enterprise.com>

<?xml version="1.0" encoding="UTF-8"?>
<presence xmlns="urn:ietf:params:xml:ns:pidf"
          xmlns:gp="urn:ietf:params:xml:ns:pidf:geopriv10"
          xmlns:gbp="urn:ietf:params:xml:ns:pidf:geopriv10:basicPolicy"
          xmlns:ca="urn:ietf:params:xml:ns:pidf:geopriv10:civicAddr"
          entity="pres:12345@11.22.33.44">
   <tuple id="OS-0001232f59a8">
      <status>
         <gp:geopriv>
            <gp:location-info>
               <ca:civicAddress>
                  <ca:country>DE</ca:country>
                  <ca:A3>Munich</ca:A3>
                  <ca:HNO>51</ca:HNO>
                  <ca:RD>Hofmannstraße</ca:RD>
                  <ca:LOC>Room 100</ca:LOC>
                  <ca:FLR>1</ca:FLR>
               <ca:civicAddress>
            </gp:location-info>
            <gp:usage-rules>
               <gbp:retransmission-allowed>false</gbp:retransmission-allowed>
            </gp:usage-rules>
            <gp:method>LLDP-MED</gp:method>
         </gp:geopriv>
      </status>
      <timestamp>2011-12-19T14:01:29Z</timestamp>
   </tuple>
</presence>
```

METHOD OF CONVEYING A LOCATION INFORMATION REPRESENTING A PHYSICAL LOCATION OF A COMMUNICATION DEVICE, A COMPUTER PROGRAM PRODUCT FOR EXECUTING THE METHOD, AND THE COMMUNICATION DEVICE FOR CONVEYING THE LOCATION INFORMATION

CROSS-REFERENCE TO RELATED APPLICATIONS

This application is a continuation application of U.S. patent application Ser. No. 15/204,267, which is a continuation of U.S. patent application Ser. No. 14/378,858, which is the United States national phase under 35 U.S.C. §371 of PCT International Application No. PCT/EP2012/003543, filed on Aug. 21, 2012, and claiming priority to PCT International Application No. PCT/EP2012/003035, filed on Jul. 18, 2012 and PCT International Application No. PCT/EP2012/003148, filed on Jul. 25, 2012.

BACKGROUND OF THE INVENTION

Field of the Invention

Embodiments relate to methods of conveying a location information representing a physical location of a communication device from the communication device to another communication device. Embodiments further relate to a computer program product for executing such a method and to the communication device for conveying the location information.

Background of the Related Art

A location information provided in an element of a device such as a communication device, e.g a mobile or an IP phone, represents the physical location of the device. This location information may be used by emergency services as NG911 (Next Generation 9-1-1) or NG112 (Next Generation 1-1-2) to locate the device that initiated an emergency communication request. Such a location information may be expressed as a civic location, e.g. a postal address, and/or as geospatial coordinates, e.g. a map location. The physical location of the device is required in order for the telephony server to locate a suitable emergency services number to be used to place the call (routing). This number is obtained by interrogating a remote Location to Service Translation server (LoST-server). This interrogation may be hampered by issues with connecting to the LoST-server, e.g. the LoST-server or the network connection of the LoST-server may be down. The standardization for NG911/NG112 requires the calling device in the form of a SIP endpoint
  to convey the actual physical location during an emergency call. Updates have to be conveyed via a SIP INVITE or SIP UPDATE request,
  to contact a mapping service based on the latest location information in order to obtain routing information during start-up and immediately before the emergency call set-up,
  to validate the latest location information to ensure that the provided physical location is a valid and existing civic address or map location during start-up and immediately before the emergency call set-up. While obtaining the routing information is done via the LoST-server, validation is done via a Location Validation Function server (LVF-server) wherein the obtaining of the routing information and the validating of the latest location information may be done by the mapping service comprising the LoST-server and the LVF-server. If the SIP endpoint fails to contact the mapping service in time before an emergency call, the SIP endpoint must use cached data.

In case of network environments, where a SIP endpoint contacts the mapping service via a SIP-server, the SIP-server contacts the mapping service on behalf of the registered SIP endpoint. If the SIP-server obtains the latest location information during the emergency call via a SIP INVITE or a SIP UPDATE request and fails to contact the mapping service for any reason, missing information might be the result. Additionally, if the SIP-server contacts the mapping service, but the location validation fails during the emergency call, the routing decisions may be based on a wrong, mistyped or incomplete civic address or map location. Updating the location information cached by the SIP-server by conveying the physical location of the SIP endpoint to the SIP-server periodically to keep the SIP-server updated before an emergency call is set up, however, has disadvantages: the physical location of a SIP endpoint or any other communication device is generally regarded to be sensitive information that should not be proliferated. Furthermore, there is an increased processor load involved by the SIP endpoint or the communication device periodically acquiring and sending location information. The sending of the location information from the SIP endpoint to the SIP-server is associated with an additional signaling load on the network used by the SIP endpoint in order to convey the physical location information to the SIP-server. Also, the SIP-server has to process and cache the location information provided by the SIP endpoint although this location information may not be used in an emergency call and therefore be outdated recently after being received from the SIP endpoint. Thus processing and memory resources of the SIP-server are reserved and allocated to location information periodically sent by the SIP endpoint even in cases where this location information will never be used in an emergency or other call. The conflict of having updated location information available while avoiding to reserve processing, network, and memory resources due to transmitting and storing location information potentially not used, may occur for any location-based service with or without a time critical aspect to obtaining location information relating to the current physical location of a device.

Existing standards advocate the use of a SIP INVITE request or a SIP UPDATE request to convey a changed physical location of a SIP endpoint. However, the use of the SIP INVITE request is only appropriate if the physical location was changed whilst in a call since generating a new call by using another SIP INVITE request may lead to interactions which block further calls based on policies, resources or priorities. Using the SIP UPDATE request to indicate a changed physical location prior to call establishment means that the SIP endpoint must support conveying the location information in an additional SIP message type. This may lead to inefficiency and maintenance problems. Another call independent mechanism for conveying a changed physical location has been standardized in RFC6447 (RFC: Request For Comments) by using a SIP Event Package. This mechanism requires additional support for the Event Package by both, the SIP-server and the SIP endpoint. Additionally, RFC6447 is designed to dereference location information for a specific target from a central server.

BRIEF SUMMARY OF THE INVENTION

Embodiments provide updated location information to a location-based service while reducing the transmission and processing load associated with the provision of the updated location information. One embodiment includes a method of conveying a location information representing a physical location of a communication device from the communication device to another communication device. The method may include:

acquiring by the communication device a first location information and a second location information, the second location information being acquired subsequently to the acquiring of the first location information, detecting by the communication device a deviation of the second location information from the first location information representing a change of the physical location of the communication device, and, triggered by the detected change of the physical location of the communication device, conveying the most recently acquired physical location of the communication device to the other communication device by sending a signaling message by the communication device to the other communication device, the signaling message comprising either the second location information or the deviation of the second location information from the first location information.

BRIEF DESCRIPTION OF THE DRAWINGS

Further embodiments and advantages of the invention are highlighted in the following with respect to figures. For an improved clearness, the figures are not true to scale or proportionate. In the figures, as long as not mentioned otherwise, same references indicate same parts with same meaning. It illustrates:

FIG. 1 a schematic flow of messages from the communication device in form of a SIP device to the other communication device in form of a SIP-server according to the invention, FIG. 2 a schematic flow of signaling messages between a SIP endpoint, a SIP-server and a mapping server according to the invention, FIGS. 3a, b a table of specific forms of transportation means, data analyzed from location information of the specific forms of transportation means by a location conveyance policy, and location update trigger parameters per specific form of transportation according to the invention, FIG. 4 a schematic communication system for providing NG911/NG112 location-based services according to the invention and FIG. 5 a signaling message in form of a SIP reREGISTER request message according to the invention.

Figure 4:
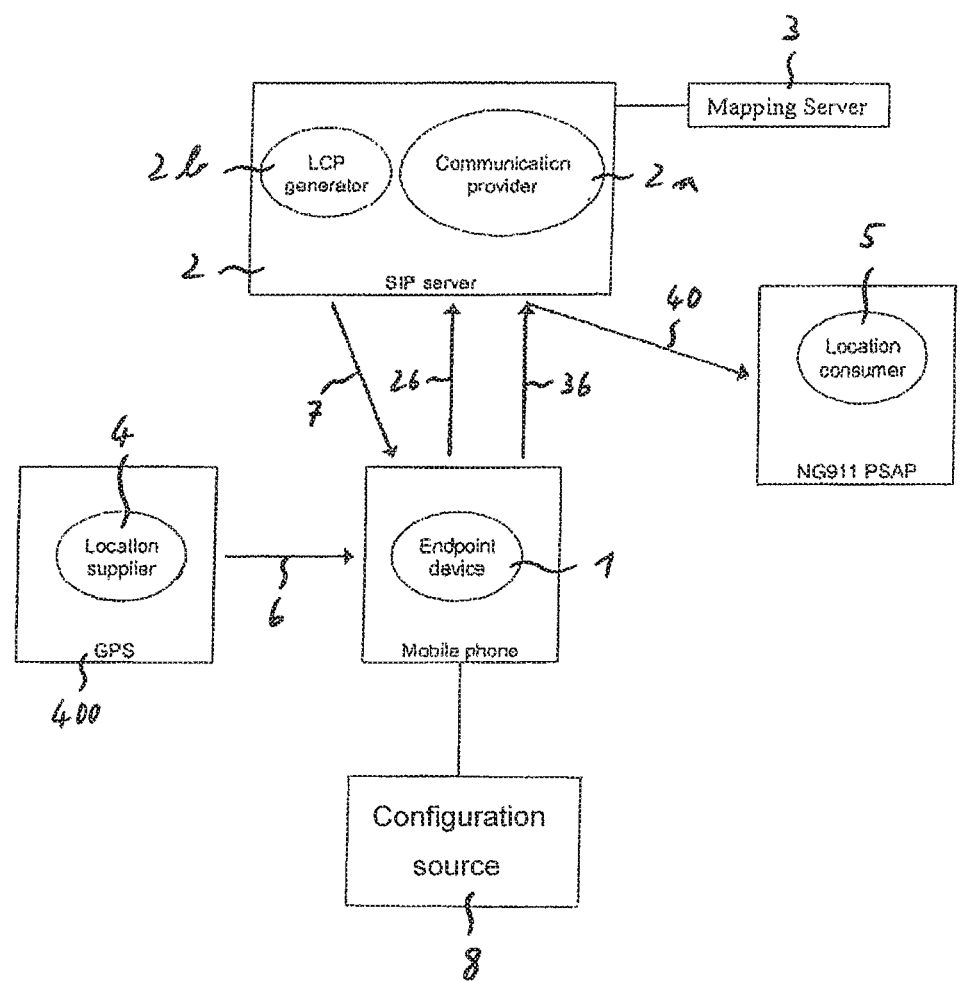

The method of conveying a location information representing a physical location of a communication device from the communication device to another communication device comprises acquiring by the communication device a first location information and a second location information, the second location information being acquired subsequently to the acquiring of the first location information. A method further comprises detecting by the communication device a deviation of the second location information from the first location information representing a change of the physical location of the communication device, and, triggered by the detected change of the physical location of the communication device, conveying the most recently acquired physical location of the communication device to the other communication device by sending a signaling message by the communication device to the other communication device, the signaling message comprising either the second location information or the deviation of the second location information from the first location information. The location information may be a value or a set of values related to a civic location or geospatial coordinates of a physical location. The civic location may be a postal address, wherein the geospatial coordinates may define a map location. While the first location information may be a civic location, the second location information may be geospatial coordinates or vice versa.

The communication device may be a mobile or stationary unit capable of sending and/or receiving data over a communication connection. For example, the communication device and the other communication device, respectively, may be a mobile phone, an IP phone, a Personal Digital Assistant, a tablet PC, a laptop or the like. The communication device and the other communication device, respectively, may also be a stationary unit such as a desktop PC or a server. While these units are stationary by itself, they still may be movable by being operated for example on a car, boat, ship, bus, or airplane. The deviation detected by the communication device may be any changed value distinguishing the second location information from the first location information.

If the first location information is a civic location and the second location information are geospatial coordinates and a deviation in the value of the second location information from the first location information represents no change of the physical location of the communication device, the changed value between the first location information and the second location information is not regarded to be a deviation. Instead, any change of the second location information from the first location information representing a change of the physical location of the communication device is regarded to be a deviation.

The deviation may be set or predetermined by a single or several parameters of the user of the method or be determined by the tolerance of the acquired first and second location information. For example, the deviation may be determined to be 10 m leading to a radius of 10 m around the first location wherein any change of the physical location of the communication device is not regarded to be a deviation of the second location information from the first location information. Other values are possible.

On the other side, the deviation could be just the tolerance of the acquired first and second location information in that any changed value between the second location information and the first location information is regarded to represent a change of the physical location of the communication device even if there is no actual change of the physical location of the communication device associated with the deviating values of the second location information and the first location information, e.g. if a source of the location information may have changed. Any detected change of the physical location information of the communication device is a trigger for conveying the physical location of the communication device to the other communication device.

If there is a communication connection between the communication device and the other communication device hampered or lost or not established, the detected change of the physical location of the communication device is a trigger for establishing or re-establishing a required connection between the communication device and the other communication device in order to convey the physical location of the communication device to the other communication device.

Since the detected change of the physical location is a trigger for conveying the physical location of the communication device to the other communication device, the most recently acquired physical location of the communication device is conveyed to the other communication device. The most recently acquired physical location of the communication device is the physical location associated with the second location information. The signaling message sent by the communication device to the other communication device for conveying the most recently acquired physical location of the communication device therefore comprises either the second location information or the deviation of the second location information from the first location information.

When sending the deviation of the second location information, the previously conveyed physical location of the communication device that is associated with the first location information is expected to have been received by the other communication device enabling the other communication device to derive the physical location of the communication device associated with the second location information by processing the deviation of the second location information from the first location information.

Sending the deviation of the second location information from the first location information instead of sending the second location information itself has the advantage of protecting the privacy of the user of the communication device more effectively than sending the actual second location information since any unauthorized receiver, such as a man in the middle, requires the first location information as a pre-requisite to calculate the most recent conveyed physical location of the communication device associated with the second location information. The signaling message may be any request sent from the communication device to the other communication device on a signaling level. Therefore, a payload connection between the communication device and the other communication device is not necessary for conveying the most recently acquired physical location of the communication device to the other communication device.

The Session Initiation Protocol (SIP) may be used for signaling. Other protocols allowing a signaling connection between the communication device and the other communication device are possible. Using the detected change of the physical location of the communication device as a trigger for conveying the physical location of the communication device to the other communication device is advantageous in that there is no signaling message comprising information about a physical location of the communication device sent to the other communication device if there is no changed physical location of the communication device detected. When the detected change of the physical location of the communication device is used as a trigger for conveying the acquired physical location, it is safeguarded that the most recently acquired physical location of the communication device is sent to the other communication device while sending physical location of the communication device occurs only if there is a change in the physical location of the communication device.

Since the change of the physical location of the communication device may be set or predetermined by the deviation of the second location information from the first location information, the number of signaling messages and therefore the signaling load may be set or predetermined by the deviation of the second location information from the first location information. Furthermore, the signaling load may be predetermined by the acquisition times for acquiring the first location information and the second location information. With an increasing time interval between acquiring the first location information and the second location information, the number of signaling messages will decrease and therefore the signaling load will decrease as well. With the decreasing signaling load, there is associated a decreasing processing load for detecting a deviation of the second location information from the first location information in the communication device and/or a decreasing processing load in the other communication device for processing and/or storing the conveyed most recently acquired physical location of the communication device.

LLDP-MED, which is the enhancement Media Endpoint Discovery of LLDP (Link Layer Discovery Protocol) or a configuration management system may be used for providing the first location information and the second location information which are acquired by the communication device. When using LLDP-MED, a LLDP-MED (enabled LAN) switch may be used as a source for acquiring the first and/or second location information. Alternatively, an internal or external configuration management system including as a result a manual change of the location information where the location is not being derived by an automatic means may be used as a source for acquiring the first and/or second location information such as an external GPS (Global Positioning System) sensing unit or a GSM (Global Standard for Mobile Communication) station processing the single strength of several signals received from the communication device at several receiving units located at different locations in order to calculate the physical location or position of the communication device. Other wired or wireless means for providing the first and/or the second location information are possible, such as an enterprise location server. Thus, a location source may be internal [LLDP-MED, DHCP (Dynamic Host Configuration Protocol), enterprise server, manual means, etc.] or external (GPS, network calculated location information, etc.).

In another embodiment, if another signaling message is sent by the communication device to the other communication device despite failing to detect a deviation of the second location information from the first location information as a change of the physical location of the communication device, it is avoided that the other signaling message comprises location information. As long as there is detected no change of the physical location of the communication device, signaling messages sent from the communication device to the other communication device do not comprise location information related to the communication device. By the signaling message not comprising location information in the case where there is no change of the physical location of the communication device detected, there is guaranteed a maximum privacy of the user of the communication device in terms of not broadcasting the physical location of the user represented by the physical location of the communication device while ensuring that the latest or most recently acquired location information representing the physical location of the communication device is sent to the other communication device, for example to a SIP-server prior to an emergency call initiated by the communication device. A signaling message including location information is therefore sent from the communication device to the other communication device only after detection of a new physical location of the communication device. Other signaling messages that are not caused by a location update do not contain location information. There may be a time interval set or predetermined for sending out another signaling message after sending a previous other signaling message for ensuring that signaling messages are periodically sent from the communication device to the other communication device, for example to maintain a registration of the communication device at the other communication device or vice versa.

In this context, another embodiment relates to using an endpoint device as the communication device, using a server as the other communication device, and refreshing a registration of the endpoint device at the server by sending the signaling message to the server. Refreshing the registration of the endpoint device at the server may be accomplished by sending the signaling message or another signaling message not comprising location information. A time interval set for refreshing the registration between sending of other signaling messages not comprising location information may be applied after sending the signaling message comprising location information. It is thus possible, that after sending the signaling message comprising location information another signaling message without location information is sent or that a subsequent signaling message comprising location information is sent which follows the signaling message comprising location information.

In another embodiment a SIP endpoint device is used as the endpoint device, a SIP-server is used as the server, and a SIP reREGISTER request is used as the signaling message. Using a SIP endpoint device, a SIP-server and SIP reREGISTER request is of particular relevance with regard to Next Generation emergency calls associated with NG911 and/or NG112. Using a SIP reREGISTER request as the signaling message has the advantage of reusing an initial SIP REGISTER message to convey a changed physical location since the initial SIP REGISTER message for registering the communication device at the other communication device is used to convey the physical location of the communication device to the other communication device anyway. With the SIP REGISTER message being used to convey the physical location of the communication device to the other communication device for registration, the support for providing the physical location is constrained to as few SIP methods as possible minimizing the impact on the code base and improving maintainability. The use of a SIP registration refresh in the form of a SIP reREGISTER request serves a dual purpose of conveying the physical location at the same time as refreshing the registration session thus reducing messaged traffic and signaling load. With the communication device being already able to support conveying its physical location in a SIP REGISTER request, the inventive method of using a SIP reREGISTER request is automatically available for the communication device for conveying not only an initial physical location but also a change of the physical location. With the change of the physical location being conveyed from the communication device to the other communication device, the SIP reREGISTER request message is reused for conveying a change of its physical location while refreshing its reregistration at the other communication device. When the physical location of the communication device changes, by using a SIP reREGISTER request message the registration of the communication device is immediately refreshed at the other communication device by sending a SIP reREGISTER request comprising the changed physical location of the communication device. Regarding the sending of other signaling messages not comprising location information as a schedule, the SIP reREGISTER request being sent from the communication device to the other communication device provides the refreshing of the registration ahead of schedule.

Triggered by the SIP-server receiving the SIP reREGISTER request, a mapping server may be queried by the SIP-server for obtaining routing information with respect to the second location information conveyed to the SIP-server and the mapping server may be further queried by the SIP-server for validating the second location information, wherein the queried routing information and validated second location information are stored in the SIP-server. The SIP-server thus is able to contact the mapping server with the latest location information available from the SIP endpoint and prior to an emergency call. Moreover, by conveying a changed physical location of the SIP endpoint to the SIP-server, the SIP-server is allowed to cache the updated location information, contact the mapping server, store the look-up results and perform location validation. It is thus guaranteed that the routing information obtained from the mapping server by the SIP-server is based on the latest SIP endpoint physical location and can be used during an emergency call even in the case, where a physical location conveyed to the SIP-server during the emergency call is wrong, mistyped or incomplete. With the SIP reREGISTER request message being sent to the SIP-server only if there is a change of the physical location of the SIP endpoint, the location information as sensitive information is not exposed if not necessary to be conveyed to the SIP-server for the SIP-server having stored updated location information. Moreover, the SIP-server is not required to pass each SIP reREGISTER request for a change of the physical location of the communication device. The SIP-server is therefore able to provide a NG911 and/or NG112 compliant solution by caching/storing the location information and routing information on receipt of a location update in form of a SIP reREGISTER request message so that the cached location information and routing information with respect to the SIP endpoint are available in any case during the emergency call, validating the location information in time, so that actions can be taken if successful validation fails, for example in form of the SIP-server contacting the SIP endpoint for repeating the sending of a SIP reREGISTER request message comprising the most recent physical location of the SIP endpoint.

The inventive method may be applied to any location-based service and is therefore not restricted to the service provided by the mapping server (mapping service). The use of SIP reREGISTER messages as registration refresh measures reduces the number of SIP requests that convey the physical location of the SIP endpoint representing the physical location of the user of the SIP endpoint to a minimum. By only including the location information in a single SIP reREGISTER message as a registration refresh following a change of the physical location of the SIP endpoint, the exposure of the sensitive information of the physical location of the SIP endpoint is reduced.

In another embodiment a time interval between acquiring the first location information and the second location information or a condition resulting in the change of the physical location of the communication device is set by at least one location update trigger parameter of a location conveyance policy (LCP) used by the communication device. The at least one location update trigger parameter and thus the time interval is determined depending on a signaling load caused by sending the signaling message and/or a resolution of the physical location of the communication device. The location update trigger parameter may be a predetermined value of the time interval or, as examples for conditions resulting in the change of the physical location of the communication device, a predetermined change of direction, a predetermined change in position, a predetermined change of speed. As soon as the time interval lapsed or the condition is fulfilled the second location information is acquired. The lapse of the time interval or the fulfillment of the condition serves as a trigger for acquiring the second location information. The lapse of the time interval defines a condition that may result in a change of the physical location of the communication device. In principle, any condition that may result in a change of the physical location of the communication device, comprising those that result in a change of the physical location of the communication device, may serve as a trigger for acquiring the second location information once the condition is fulfilled. The point in time for acquiring the second location information is thus determined by the condition that may result in a change of the physical location of the device.

The direction of the communication device is defined in the following as an arrow in space. The position of the communication device is defined as the physical location of the communication device. The speed of the communication device is defined as a change of the position of the communication device divided by a time interval in which the change in position of the communication device occurs. A predetermined value may be set as a fixed value or as a dynamic value changing over time. The location conveyance policy may comprise a single or several location update trigger parameters. Each location update trigger parameter depends on the signaling load caused by sending the signaling message or signaling messages and/or the resolution of the physical location of the communication device. The resolution of the physical location of the communication device depends inversely on the measuring tolerance of the location information representing the physical location of the communication device. The smaller the measuring tolerance of the physical location, the higher the resolution of the physical location becomes. The signaling load and/or the resolution of the physical location may be set or predetermined in order to derive a single or several location update trigger parameters for setting the time interval between acquiring the first and the second location information or the condition resulting in the change of the physical location of the communication device. The signaling load may depend on a processing capability of the communication device such as a desk phone, car phone, mobile phone, IP phone and the like. The signaling load may also depend upon a battery life of the communication device which may restrict the transmission of the signaling messages and therefore govern the signaling load. The resolution of the physical location may depend upon the measuring tolerance of the location information acquired by the communication device and/or on the required resolution of the other communication device hosting a location-based service such as NG911 and/or NG112. The location conveyance policy is targeted therefore to the form of the communication device, e.g. a desk phone, car phone, mobile phone or stationary communication unit arranged on a ship or airplane. The location conveyance policy may further depend upon the current physical location of the communication device. The location conveyance policy may be executed by an LCP-server that may be integrated as part of an existing server function or to be stand-alone. As such, the LCP-server may be an integral part of a SIP-server or other existing server or the LCP-server may be a stand-alone server.

The at least one location update trigger parameter of the location conveyance policy may depend on:
the form of the location information
information as a civic location that ranges from being very coarse, e.g. a building, to very fine, e.g. to a specific seat on a floor information as geospatial coordinates which will normally be quite specific but may also be coarse by defining a bounded geographic region such as a section of a city, a city, a lake region or a mountain region,
the capabilities of a source of the first and second location information
requirements for using the first and second location information, e.g.
of a public NG911 Public Safety Answering Point (PSAP),
of governmental regulations, such as military. For example, NASA (National Aeronautics and Space Administration) requires a granularity of location information relating to the resolution of the physical location on a "per cubical" basis (office cubicles),
of presence-based applications such as user tracking for a "where is he" type service where the user may be a resource to be located, e.g. a printer, or an individual which movements are to be recorded by a security system, e.g. for investigating security incursions,
security systems and the like.

Thus, requirements of a "consumer" of the first and second location information, such as a receiving unit, for example a SIP-server, may also influence the determination of the at least one location update trigger parameter of the location conveyance policy to ensure that the location information provided is of the required resolution of the physical location of the communication for use by the consumer of the location information. If for example the location information is required once per day only, the time interval will be set to one day leading to a small signaling load and a small resolution of the physical location of the communication device. If on the other side, location information is required for being able to provide routing information in an emergency call, a high resolution of the physical location of the communication device, such as a specific seat on a floor, may be required and therefore the time interval may be set to once a minute resulting in a large signaling load for providing the required resolution of the physical location of the communication device. Thus, depending on the trade-off between minimizing the signaling load and maximizing the resolution of the physical location of the communication device, the at least one location update trigger parameter may be set as required/appropriate.

Advantageously it is determined by the location conveyance policy when another location conveyance policy is to be acquired by the communication device. If a location policy comprises only a single update trigger parameter, any change of a location update trigger parameter is associated with another location conveyance policy which is to be acquired by the communication device. The given location conveyance policy may therefore not only comprise a single or several location update trigger parameters but also requirements when not to use the single or the several location update trigger parameters anymore, leading to requirements for acquiring another location conveyance policy by the communication device. For example, if a predetermined change of direction, a predetermined change in position, or a predetermined change of speed may exceed a predetermined value or range, the location conveyance policy may acquire another location conveyance policy.

The information provided by the location conveyance policy to determine when a another/new LCP is to be acquired may comprise at least one of the following:
a time period from a last acquisition of a location conveyance policy, a count of location updates since the last acquisition of a location conveyance policy, a time of a day, entering or exiting a predetermined/prescribed geographic region wherein the communication device is located, on becoming stationary, for example working in an office compared to driving by car, on entering or exiting an altitude range of a specific form of transport means carrying the communication device, on entering or exiting a speed range of a specific form of transport means carrying the communication device, on moving a specific distance since a last acquisition of a location conveyance policy, being for instance the deviation between the first and second location information, on changing direction/heading of a specific form of transport means carrying the communication device, on entering or exiting a specific heading range, being for example a segment of a circle or a spherical segment, and on transition between a maintained direction and a maintained variable direction, being for example a transition from a segment of a circle or spherical segment of 10 degrees to a segment of a circle or spherical segment of 30 degrees. In addition, the location conveyance policy may indicate when an acquired 3-point-coordinate-system should be used. The location conveyance policy may alternatively or in addition indicate conditions for treating the last acquired physical location of the communication device as no longer being valid.

The location conveyance policy may comprise at least one specific form of a transport means also called transportation, carrying the communication device, wherein at least one location update trigger parameter is allocated to/associated with the specific form of transport means. A transport means may be a commercial plane, a private plane, a ship, a sailboat, a motor boat, a canal/lake boat, a train, a coach, a bus, a car/motorbike, a bicycle or a walking person. The transport means may also be for instance a conveyance container in an automated factory. Generally, any moving or movable entity may qualify as a specific form of a transport means.

The location conveyance policy may be acquired by the communication device by configuration, wherein the communication device is connected to an external configuration source or by signaling, wherein the signaling message is reused to acquire the location conveyance policy. In any case the location conveyance policy, more accurately be at least one location update trigger parameter of the location conveyance policy determines when a current physical location of the communication device should be signaled provided that there is the detected change of the physical location of the communication device. When the location conveyance policy is acquired by the communication device by configuration, the communication device is connected to an external configuration source. The establishment of the connection between the configuration source and the communication device may be initiated by the configuration source due to a trigger, e.g. from an internal or external LCP-server, or the establishment of the connection may be initiated by the communication device. Therefore, the connection to an external configuration source for acquiring the location conveyance policy by configuration may be initiated by the configuration source or by the communication device. A communication device initiated connection may be triggered by an event independent of physical location changes. Alternatively, the communication device initiated connection may be triggered by physical location changes of the communication device as set or predetermined by information in the last location conveyance policy received by the communication device. If the location conveyance policy is acquired by the communication device by signaling, the signaling message used to convey the physical location of the communication device to the other communication device may be reused to acquire another/a new location conveyance policy, e.g. as a response to the signaling message that conveyed the physical location of the communication device to the other communication device.

In an advantageous embodiment, the at least one location update trigger parameter is dependent on an information to predict a route and/or an estimated time of arrival of a specific form of transport means carrying the communication device such as a schedule of a user of the communication device, a time-table of the user of the communication device, a flight plan of the user of the communication device, a map indicating a route of the user of the communication device, a destination entered by the user of the communication device into a navigation system, an estimated time of arrival calculated by the navigation system upon entering a destination by the user of the communication device, an itinerary of the user of the communication device, and a calendar of the user of the communication device.

The dependence of the at least one location update trigger parameter on the information to predict a route and/or an estimated time for arrival may be in a form of a predictive algorithm which may be used to improve an existing LCP. Alternatively, an LCP could be generated by considering information to predict a route and/or an estimated time of arrival right from the start. For example, where transport of the communication device is highly predictable, e.g. in case of a commercial plane, the time interval or change in the physical position as the condition to be fulfilled may be rather large, for example one/several hours or 50/100 km, but on disembarking the time interval or change in the physical position as the condition to be fulfilled may be changed to allow for transition to other types of transport means. This transition may be predicted based on schedules, time tables and/or flight plans etc. which may allow an estimated time of arrival to be predicted. However, the changes in physical location of the communication device may indicate that the estimated time of arrival needs to be revised, e.g. a plane enters a holding pattern rather than descending to land as scheduled. Information to predict a route and/or an estimated time of arrival may also be acquired from a presence-based system. The schedule, time table, flight plan, map, itinerary, and/or calendar may be in electronic form only.

The at least one location update trigger parameter may be specific to a form of location information, such as a civic location or geospatial coordinates of the physical location of the communication device. For civic locations, the location conveyance policy, more accurately the at least one location update trigger parameter of the location conveyance policy, indicates when a new location information of the communication device is to be sent to the other communication device if there is a change of the physical location of the communication device. The time interval between acquiring the first and second location information may and/or the condition resulting in the change of the physical location of the communication device may depend upon a change to any location element, the location element being any element which is part of a location information, e.g. <ca:FLR>1</ca:FLR> of floor 1 of a civic location comprising information of a building and a floor, a change to any data element except specific location elements, e.g. a change of a room, the room not being part of a location information;

periodically, e.g. one minute, one hour, one day or any other time interval, or alternating sequences of time intervals differing from each other, a set or predetermined time interval starting from a last physical location conveyance before a subsequent physical location conveyance is allowed, after the communication device has been used, e.g. after pushing a button for shutting the communication device down, but before the communication device has been shut down, a priority for civic location when the location information acquired comprises geospatial coordinates, also called geospatial information.

For geospatial coordinates the LCP, more accurately the at least one location update trigger parameter of the location conveyance policy, may indicate when a new physical location of the communication device is conveyed to the other communication device provided that there is a change in the physical location of the communication device. The time interval between acquiring the first and the second location information and/or the condition resulting in the change of the physical location of the communication device, i.e. the condition determining when a location is to be conveyed, may be set or predetermined by changes of any geospatial coordinates and bounds for a change per geospatial coordinate, changes to a specific coordinate, changes to an altitude of the form of transport means carrying the communication device, a change of a direction/heading of a specific form of transport means carrying the communication device. A direction is defined as an arrow in space wherein a heading is defined as indicating a direction to reach a planned destination, being final or intermediate. For example, a plane assumes a fixed heading in flight but can vary speed and altitude for the same heading. The heading may change at "way points" which form an intermediate destination for a flight of the plane/a journey, a rate of change of an altitude of a specific form of transport means carrying the communication device, periodically, for example one second, one minute, one hour, one day or the like, the time interval from a last physical location conveyance of the communication device to the other communication device, after the communication device has been used, e.g. after pushing a shut off button but before the communication device is being shut off, by entering or exiting a predetermined geographic region, such as a car, an airport, a building etc., on becoming stationary, e.g. by comparing the speed of movement of the communication device, for example walking from the parking lot to the office being regarded as being mobile while entering the office and staying in the office is defined as becoming stationary, on entering or exiting an altitude range of a specific form of transportation means carrying the communication device, on entering or exiting a speed range of a specific form of transport means carrying the communication device, on moving a specific distance since the last physical location conveyance, such as a predetermined deviation between the first and second location information, on entering or exiting a specific heading range, such as a predetermined angle, e.g. 30 degrees, of a specific form of transport means carrying the communication device, or on transition between a maintained direction and a maintained variable direction, such as transiting from the first direction change over time to a second direction change over time. For example, the first change in direction may range in a regime of 10 degrees, while the second change of direction may be larger compared to the first change in direction, for example 30 degrees. A direction or range of a direction change may be defined by a segment of a circle or a spherical segment. Location information sent by the communication device to the other communication device may be used to identify a specific form/type of transport/transport means/transportation involved for changing the physical location of the communication device and used to provide a suitable LCP for location updates in order to provide a required/appropriate signaling load and/or resolution of the physical location of the communication device.

As different means of signaling may be used to convey the physical location of the communication device when setting the time interval between acquiring the first and the second location information or the condition resulting in the change of the physical location of the communication device by the at least one location update trigger parameter of the location conveyance policy, the LCP is independent of a specific signaling mechanism used by the communication device to acquire the location conveyance policy. The LCP may be "pushed" to the communication device by a server/LCP-server, or the LCP may be "pulled" by the communication device from the server/LCP-server based on conditions controlled by the server/LCP-server. An LCP pull may overcome issues of restricted accessibility by the LCP providing "server" when a NAT (Network Address Translation) or Firewall intervenes the connection between the server and the communication device. The LCP may define enhancements over the standardized approach of sending changed physical locations of the communication device periodically, the enhancements enabling the consumer/receiving unit of the physical location of the communication device to ensure that the consumer/receiving unit only receives the location information it requires for executing the location-based service supported by the consumer/receiving unit. The LCP may be delivered dynamically and the LCP may be adjusted based on previously conveyed physical locations of the communication device. The type/role of the location consumer/receiving unit may impact the LCP. The at least one location update trigger parameter of the location conveyance policy may be designed to reflect popular forms of transport means/transportation for the device. The LCP may be used with predictive algorithms based on external information sources to further control the time interval between acquiring the first and second location information or the condition resulting in the change of the physical location of the communication device, i.e. the conditions for acquiring the first and second location information.

A computer program product for executing the inventive method as outlined above may be provided. The computer program product may be a software product comprising instructions. The computer program product may be comprised by a machine readable medium wherein the machine readable medium may be a floppy disk, a CD (compact disc), a DVD (digital versatile disc), or any other suitable digital or analogue medium.

The invention further comprises a communication device for conveying a location information representing a physical location of the communication device from the communication device to another communication device, wherein the communication device comprises: an acquisition unit configured to acquire a first location information and a second location information, wherein the second location information is acquired subsequently to the acquisition of the first location information. The communication further comprises a detection unit configured to detect a deviation of the second location information from the first location information representing a change of the physical location of the communication device, and a conveyance unit configured to convey the most recently acquired physical location of the communication device to the other communication device by sending a signaling message to the other communication device triggered by the detected change of the physical location of the communication device, wherein the signaling message comprises either the second location information or the deviation of the second location information from the first location information. The object of the invention is solved by this communication device for the same reasons as outlined above with respect to the inventive method. The communication device may be a mobile phone, a wired phone, such as an office phone, a PDA (Personal Digital Assistant), a PC (Personal Computer) or tablet PC or any other communication device comprising the apparatus features as outlined above. The first location information and/or the second location information may be provided by location sources such as a DHCP supporting server/switch, an LLDP-MED supporting LAN server/switch or an external configuration management system. LLDP-MED is the enhancement media endpoint discovery of LLDP. LLDP-MED has been registered by the Internet Assigned Numbers Authority (IANA) as a valid value. The method element is defined by RFC4119 as an optional "method" element describing the way a location information is derived or discovered. An external configuration management system may provide a manually configured value and/or comprise a GPS sensor or a base station processing several signal strengths of signals of the communication device received by several receiving units being located at different positions from each other. An internal (LLDP-MED, DHCP, enterprise server, manual means, etc.) or an external location source (GPS, network calculated location information, etc.) is thus possible.

The invention further comprises a communication system comprising the communication device as outlined above, the other communication device connected to the communication device, and a location conveyance policy unit connected to the communication device, wherein the location conveyance policy unit is configured such that a time interval between acquiring the first location information and the second location information or a condition resulting in the change of the physical location of the communication device is set by at least one location update trigger parameter of a location conveyance policy used by the communication device, wherein the location update trigger parameter is determined depending on a signaling load caused by sending the signaling message and/or a resolution of the physical location of the communication device, thus determining or at least influencing the load and/or the resolution, wherein the location update trigger parameter may be one of
  a predetermined value of the time interval,
  a predetermined change of direction of the communication device,
  a predetermined change in position of the communication device, and
  a predetermined change of speed of the communication device.

The location conveyance policy unit may be in the form of a server being integrated in the other communication device or being a stand-alone unit.

In FIG. 1, the inventive communication device is represented by a SIP device 1 sending SIP REGISTER request messages as signaling messages comprising location information 12, 26 and not comprising location information 21, 23, 31 to the other communication device represented by a SIP-server/registrar 2. A vertical arrow indicates a timeline starting with the SIP REGISTER request message 12 and ending with the SIP REGISTER request message 31. The SIP device 1 may be a phone such as a mobile or IP phone. At the beginning of the flow of SIP REGISTER signaling messages from the SIP device 1 to the SIP-server 2, the SIP device in the form of a phone starts up requiring the SIP device 1 to acquire its physical location since the SIP device 1 may have been moved before starting up and registering with the SIP-server 2 for SIP operation. Once the SIP device has started up, 10, and has acquired its physical location, 11, a first SIP REGISTER request message is sent from the SIP device 1 to the SIP-server 2, 12, wherein the SIP-server 2 registers the physical location of the SIP device 1, 13, along with the SIP device 1. The SIP REGISTER message is sent by the SIP device 1 to allow the SIP device 1 to start using SIP messages for call activity. By registering, the SIP-server 2 is able to authenticate the SIP device 1 for call activity and knows the IP location of the SIP device 1 for any incoming call to the SIP device 1 to form a binding between the SIP-server 2 and the SIP device 1. The SIP device 1 needs to periodically refresh its registration with the SIP-server 2 by sending subsequent SIP REGISTER messages to maintain the binding between the SIP-server 2 and the SIP device 1. A time interval 20 between the sending of the first SIP REGISTER request message 12 and a sending of a second SIP REGISTER request message 21 is set such that the registration of the SIP device 1 at the SIP-server 2 is refreshed and the binding between the SIP device 1 and the SIP-server 2 is maintained. Another time interval 22 between the sending of the second SIP REGISTER request message 21 and a third SIP REGISTER request message 23 is set to refresh the registration of the SIP device 1 at the SIP-server 2. The time interval 22 may be set to be as long as the time interval 20. As there is no change of the physical location of the SIP device 1, the time interval 20, 22 allows for sending SIP REGISTER request messages not comprising location information periodically from the SIP device 1 to the SIP-server 2 to maintain the registration of the SIP device 1 at the SIP-server 2. Following the time interval 24, which is smaller than the time interval 20, 22, the SIP device 1 acquires a new location, 17, by acquiring a second location information, wherein the second location information is acquired subsequently to the acquiring of the first location information. The time interval 25 as the sum of the time intervals 20, 22, and 24 is the time interval between acquiring the first location information and the second location information. Since the SIP device 1 in the form of a phone detects a deviation of the second location information from the first location information, 18, a deviation is detected by the SIP device 1 of the new location from the former location. The change of the physical location of the SIP device 1 being detected as a deviation of the new location from the former location, 18, a SIP REGISTER request message comprising the location information of the new location or the deviation of the new location from the former location is sent, 26, from the SIP device 1 to the SIP-server 2. As a consequence of sending the SIP REGISTER request message, 26, the SIP-server 2 updates the physical location of the SIP device 1 and stores/caches the updated physical location of the SIP device 1. Since the SIP REGISTER request message with location information about the updated physical location of the SIP device 1 is not the first SIP REGISTER request message, the SIP REGISTER request message with location information, 26, is called a SIP reREGISTER request message. Following the time interval 20, another SIP REGISTER request message is sent, 31, from the SIP device 1 to the SIP-server 2. Since no change of the physical location of the SIP device 1 has been detected by the SIP device 1, the SIP REGISTER request message, 31, is sent without comprising location information with respect to the physical location of the SIP device 1. According to the invention, a SIP REGISTER request message following an initial SIP REGISTER request message comprising location information representing a physical location of the SIP device 1 is sent only if the SIP device 1 detects a deviation of the location information acquired after the acquiring of a previous location information. If no change in the physical location of the SIP device 1 is detected by the SIP device 1, a SIP REGISTER request message is sent from the SIP device 1 to the SIP-server 2 without comprising location information, 21, 23, 31. The SIP device 1 therefore conveys its physical location in the form of a SIP REGISTER request message, 12, just once to the SIP-server 2 to register for SIP operation by including its location information in the SIP REGISTER request, 12, using a standardized or predefined format, if there is no subsequent change of the physical location of the SIP device. In this case, the SIP device 1 periodically needs to refresh its registration using the SIP reREGISTER request, i.e. by using the same call ID as transmitted at registration, wherein the SIP reREGISTER request messages 21, 23, 31 do not comprise sensitive location information if the physical location of the SIP device 1 has not been changed.

As long as the SIP device 1 is registered for SIP operation, it may detect a change of its physical location by some means such as a LLDP-MED switch such as a LLDP-MED enabled LAN switch or an external configuration management system able to acquire location information from DHCP and/or entered locally at the device 1. Another internal or external location source as described above is possible. The change of the physical location of the SIP device 1 is conveyed as part on early SIP reREGISTER request message, 26, i.e. by using the same call ID as used at registration, comprising location information representing the most recent physical location of the SIP device 1 in an standardized or predefined format. Alternatively to conveying a changed physical location of the SIP device 1 via the SIP reREGISTER request message, 26, the change of the physical location may be conveyed. Such a deviation between an acquired location information and a previously acquired location information may be conveyed in a standardized way by using a partial PIDF (Presence Information Data format) as specified in RFC5262 and 5263. Other standardized or predefined formats are possible. Afterwards, the registration refresh interval 20, 22 may be reset as for a registration refresh SIP reREGISTER request message not comprising location information. The flow of sending SIP REGISTER request messages for updating a SIP-server 2 in terms of registration and physical location of a SIP device 1 may be used in any location-based service.

In FIG. 2, a flow of signaling messages between a communication device in the form of a SIP endpoint 1, another communication device in the form of a SIP-server/registrar 2, and a mapping server 3 is depicted. The mapping server 3 is used in an NG911/NG112 emergency call scenario for providing routing information based on a registered physical location of the SIP endpoint 1 for the SIP-server 2 being able to route an emergency call of the SIP endpoint 1 to a 911/112 destination. After start-up of the SIP endpoint 1, the SIP endpoint 1 acquires its physical location from a location source such as an LLDP-MED enabled LAN switch or an external configuration management system both of which may be capable of supporting the DHCP protocol and conveys its physical location in an initial SIP REGISTER request message, 12, to the SIP-server 2. The SIP-server 2 registers the physical location of the SIP endpoint 1, 13, and queries the mapping server 3 in order to obtain routing information and to validate the registered physical location of the SIP endpoint 1, 14. The SIP-server stores the routing information provided by the mapping server 3, 15, along with the result of a validated physical location of the SIP endpoint 1, 16. Periodically, the SIP endpoint 1 refreshes its registration at the SIP-server 2 by sending SIP reREGISTER request messages 21, 23 not comprising location information representing a physical location of the SIP endpoint 1 after a first time interval 20 and a second time interval 22, wherein the first time interval 20 may be as long as the second time interval 22.

The periodic refreshing of the registration of the SIP endpoint 1 at the SIP-server 2 is not accompanied by conveying the physical location of the SIP endpoint 1 as long as the physical location of the SIP endpoint 1 does not change. Following the third time interval 24 which is smaller than the first time interval 20 and the second time interval 22, the SIP endpoint 1 detects a deviation of an acquired location information from a formerly acquired location information. As a change of the physical location of the SIP endpoint 2 is detected by the SIP endpoint 2, an "early" SIP reREGISTER request message comprising location information with respect to the most recent and changed physical location of the SIP endpoint 1 is sent to the SIP-server 2, 26, after the time interval 25 between acquisition of both location information deviating from each other lapsed. The SIP reREGISTER request message comprising the location information representing the physical location of the SIP endpoint 1 may use a same call ID as used with the initial SIP REGISTER request message not comprising location information. The location information in the form of the location information representing the changed physical location of the SIP endpoint 1 or in the form of the deviation between the location information of the changed physical location of the SIP endpoint 1 and the formerly acquired location information of the SIP endpoint 1 is sent to the SIP-server 2 in a standardized or predefined format. A standardized format may be a civic location or geospatial coordinates. The registration refresh interval 20, 22 is reset as for a registration refresh without conveying an updated physical location of the SIP endpoint 1 to ensure that the SIP endpoint 1 is registered at the SIP-server 2. The SIP-server 2 updates the physical location of the SIP endpoint 1, 27, and queries the mapping server 3 in order to update the routing information and to validate the received location data representing the updated physical location of the SIP endpoint 1, 28. The updated routing information is sent from the mapping server 3 to the SIP-server 2, 29 and these mapping results are updated, 30, and stored in the SIP-server 2.

Following another registration refresh time interval 20, a SIP REGISTER request message is sent from the SIP endpoint 1 to the SIP-server 2 not comprising location information, 31. Following a time interval 35 which is smaller than the first time interval 20 and the second time interval 22 for refreshing the registration of the SIP endpoint 1 at the SIP-server 2, the SIP endpoint 1 sets up an emergency call by sending a SIP INVITE request message to the SIP-server 2 comprising location information representing the physical location of the SIP endpoint 1. The SIP INVITE message is sent by the SIP endpoint 1 to the SIP-server 2 to start a new call, or to change the characteristics of an existing call. The SIP-server 2 only accepts a SIP INVITE request message from a registered SIP endpoint 1 and is able to send a SIP INVITE request message only to a registered SIP endpoint 1. Therefore, the inventive sending of a SIP reREGISTER request message, 26, is not explicitly related to call activity but is a prerequisite for call activity to take place using a SIP INVITE signaling message. If the physical location of the SIP endpoint 1 changes when not in a call, then the use of a SIP INVITE is not appropriate since the use of a SIP INVITE would start a new call which is not necessary to indicate a change of the physical location of the SIP endpoint 1. Instead, a SIP REGISTER signaling message is sent, 26, as a registration refresh message comprising location information representing the physical location of the SIP endpoint 1 without an overhead of initiating a not required or unwanted call activity.

In FIG. 3a a table comprising specific forms of transportation means, 41, is shown as a left-hand column. The time interval 25 shown in FIG. 1 and FIG. 2, respectively between acquiring a first location information and a second location information acquired subsequently after acquiring the first location information is set by at least one location update trigger parameter 47 of a location conveyance policy 50, 60, 70, 80, 90 comprising a single specific form of transport means 41. The location update trigger parameter 47 depends on a signaling load caused by sending the signaling message 26, see FIG. 1 and/or FIG. 2 and/or resolution of the physical location of the SIP device/SIP endpoint 1 (see FIG. 1, FIG. 2). Location information conveyed to the SIP-server 2 (FIG. 1, FIG. 2) may be used to identify a specific form of transport means 41 carrying the SIP device/SIP endpoint 1 and used for changing the physical location of the SIP device/SIP endpoint 1, wherein the sent location information may be used by the SIP-server 2 to provide a suitable location conveyance policy (LCP) for location updates taking into account a predetermined signaling load and/or a predetermined resolution of the physical location of the SIP device/SIP endpoint 1.

Data analyzed from location information sent by the SIP device/SIP endpoint 1 to the SIP-server 2, 42 may comprise a direction 43 being an arrow of the SIP device/SIP endpoint 1 in space. Further data to be analyzed by the SIP-server 2 may comprise an area 44, a speed 45, and an altitude 46 of a specific form of transport means 41 carrying the SIP device/SIP endpoint 1. The direction 43, area 44, speed 45, and altitude 46 representing data to be analyzed from location information sent from the SIP endpoint 1 to the SIP-server 2, 42 may be used to classify which specific form of transportation means 41 is used to carry and move the SIP endpoint 1. With a location conveyance policy comprising a single specific form of transport means 41, the data 42 analyzed from the sent location information may be used by the SIP-server 2 to determine whether another location conveyance policy comprising another specific form of transport means 41 has to be sent from the SIP-server 2 to the SIP endpoint 1. For example, a location conveyance policy may comprise a single form of transport means 41 as a commercial plane 50. The commercial plane 50 is classified from the location information sent from the SIP endpoint 1 to the SIP-server 2 by a direction 43 being mostly constant over time, 51, such as changing by a spherical segment of 10 degrees in 10 minutes of time. Any area 44, 52 may qualify as an area of a commercial plane 50. A speed 45, being defined as fast by being larger than 200 miles per hour, 53, is necessary to qualify the specific form of transport means 41 to be a commercial plane. Furthermore, an altitude of the specific form of transport means 41 has to be high as being defined as larger than 1,000 ft (feet), wherein 1 ft equals/corresponds to 0.3048 m, 54, for classification of the specific form of transport means 41 to be a commercial plane. If the location conveyance policy is classified as comprising a commercial plane 50 as a specific form of transport means 41, several location update trigger parameters 47 are associated with this location conveyance policy: a first location update trigger parameter setting the time interval 25 between acquiring location information representing the physical location of the SIP endpoint 1 is a predetermined change of direction 55. Such a change of direction may be for example more than 5 degrees in a spherical segment between acquiring a former location information and a subsequent location information as a deviation. Another location update trigger parameter may be a drop in altitude of the commercial plane 50 of more than 10%, 56. Furthermore, a changed position as the most recent physical location of the SIP endpoint 1 represented by the position of the commercial plane 50 of more than 500 miles, 58 represents a location update trigger parameter for setting the time interval 25 between subsequent acquisitions of location information representing the physical location of the SIP endpoint 1 such that another signaling message comprising location information of the SIP endpoint 1 is sent from the SIP endpoint 1 to the SIP-server 2.

Instead of using a predetermined deviation of the most recent location information from the formerly acquired location information such as the change of direction 55, the drop in altitude of more than 10%, 56, and the changed position of more than 500 miles, 58, it is also possible for the location update trigger parameter to be a constant or variable time interval 25 of more than one hour, 57. In this case, the time interval 25 is set to be longer than one hour between subsequent acquisitions of location information representing the physical location of the SIP endpoint 1. Other specific forms of transport means 41 relate to a private plane 60, a ship 70, a sailboat 80, and a motor boat 90. The specific form of transport means 41 of being a ship 70, a sailboat 80, or a motor boat 90 requires the altitude 46 of the data 42 analyzed from location information sent by the SIP endpoint 1 to be approximately zero. Such an altitude may be defined as being sea level. For the specific form of transport means 41 to be a ship 70 a deviation between acquired location information is required to result in a change of speed of more than 50%, 71, of the SIP endpoint 1. Instead of setting a time window 25 between subsequent acquisitions of location information to be larger than one hour in case of the specific form of transport means 41 to be a ship, in case of a sailboat 80 being the specific form of transport means 41, the time window 25 between subsequent acquisitions of location information is set to be larger than 10 minutes, 87, as an example of a location update trigger parameter 47 for a sailboat 80. Since a sailboat usually changes its direction more frequently than a ship in a given time window, e.g. 10 minutes, it is reasonable for a given resolution of the physical location of the SIP endpoint 1 to send updated location information signaling messages more frequently with a sailboat 80 as with a ship 70 carrying the SIP endpoint 1.

In FIG. 3b further specific forms of transport means 41 in form of a canal/lake boat 100, a train 110, a coach 120, a bus 130, a car/motorbike 140, a bicycle 150, and a walking person/walking animal 160 are shown. The data to be analyzed in the SIP-server 2 from location information sent to the SIP-server 2 by the SIP endpoint 1, 42 is the same as in FIG. 3a, namely the direction 43, area 44, speed 45, and altitude 46. A location update trigger parameter 47 in case of a canal/lake boat is defined as a deviation of subsequently acquired location information of the SIP endpoint 1 to result in a changed position of the SIP endpoint 1 of larger than 0.5 miles, i.e. 0.5 miles wherein one mile equals/corresponds to 1,609,344 meters.

As a walking person or a walking animal tends to change its direction more frequently and to a larger extent as a canal/lake boat, the location update trigger parameter 47 is set with a specific form of transport means as being a walking person or a walking animal 160 to result in an location update after the position of the SIP device 1 having changed by more than 0.1 miles, i.e. 0.1 miles. Instead of a location conveyance policy comprising only a single specific form of transport means 41, it is also possible that a given location conveyance policy comprises several specific forms of transport means 41, for example a commercial plane 50, a private plane 60 and a ship 70. Another location conveyance policy may comprise a sailboat 80, a motor boat 90 and a canal/lake boat 100. A further location conveyance policy may comprise a coach 120 and a bus 130. Hereby, a coach is a form of a bus that is intended for long distance travel, whilst the bus 130 may travel within a town/city and the coach 120 may travel between towns and cities. A coach 120 is distinguished from a bus 130 and the train 110 in that unlike a train a coach travels on roads which speeds are governed by local laws. Unlike a bus 130, a coach 120 travels primarily on roads between towns/cities and thus achieves higher speeds with fewer stops than a bus 130. Instead of the SIP-server 2 the data, 42, to be analyzed from the sent location information of the SIP endpoint 1 may be analyzed by a location conveyance policy generator 2b being separated from the SIP-server 2.

In FIG. 4 a communication system for NG911/NG112 emergency call scenarios is shown. The endpoint device 1 may be in the form of a mobile phone being supplied with location information, 6, by a location supplier 4. The location supplier 4 may be a GPS sensor 400. As such, a GPS satellite signal comprising geospatial coordinates may be sent from the location supplier 4 to the endpoint device 1, 6, and be acquired by the endpoint device 1. The endpoint device 1 is connected to a SIP-server 2 comprising a location conveyance policy generator 2b and a communication provision unit 2a. A location conveyance policy is provided by the SIP-server 2 to the endpoint device 1 as a body of a SIP response, 7, to a SIP REGISTER request of the endpoint 1 sent to the SIP-server 2 (not shown). As an alternative to acquiring a location conveyance policy from the SIP-server 2, it is possible that the endpoint device 1 acquires a location conveyance policy from an external configuration source 8 outside of the SIP-server 2. It is also possible that a location conveyance policy generator 2b and a configuration source 8 are provided as alternative sources for location conveyance policies.

A SIP signaling message using a SIP REGISTER/SIP reREGISTER request message is sent from the endpoint device 1 to the SIP-server 2 to convey a location presence information data format—location object (PIDF-LO), 26. Following the sending of a SIP reREGISTER request message comprising the physical location of the endpoint device 1, a SIP signaling message using a SIP INVITE message is sent from the endpoint device 1 to the SIP-server 2 to convey another location PIDF-LO, 36. SIP INVITE messages are required in an NG911 emergency call scenario. Location information in SIP REGISTER and SIP REGISTER refresh messages (SIP reREGISTER messages) are used to update the SIP-server 2 in order to store the latest location information of the endpoint device 1 for later use. The conveyance of location information uses a SIP INVITE message to set up a call towards the NG911 Public Safety Answering Point being the location consumer 5. After the endpoint device 1 has sent a SIP INVITE message to the SIP-server 2 for initiating an emergency call, the SIP-server 2, 36, the SIP-server 2 transfers the emergency call to the location consumer 5 in form of an NG911 Public Safety Answering Point (PSAP) by sending another SIP INVITE message that includes a location PIDF-LO, 40. Within the NG911 emergency call scenario, location information cannot be conveyed to the PSAP without a SIP INVITE message of an emergency call. Before sending of a SIP INVITE message conveying the location PIDF-LO to the location consumer 5, 40, the SIP-server 2, the SIP-server 2 provides additional location information for the SIP INVITE message sent to the PSAP based on the PIDF-LO information sent from the endpoint device 1. In this scenario, the SIP-server 2 uses the PIDF-LO from the endpoint device 1 to interrogate the mapping server 3 for additional information in form of routing information and validation of the location information stored in the SIP-server 2. If the connection between the SIP-server 2 and the mapping server 3 is hampered or disabled during sending of the SIP INVITE message 36, the SIP-server 2 is still able to use the stored routing and validation information based on the sending of the SIP reREGISTER message 26 comprising the most recently acquired physical location of the endpoint 1.

Since no SIP reREGISTER request message comprising location information has been sent from the endpoint device 1 to the SIP-server 2 before the SIP INVITE message has been sent, 36, it is guaranteed that the stored routing information which may have been updated by reception of a SIP reREGISTER containing location information at the SIP-server 2 is based on the most recent physical location of the endpoint device 1 and therefore usable in a subsequent emergency call. The emergency call initiated by the SIP INVITE message being sent from the endpoint device 1 to the SIP-server 2, 36, can therefore be successfully transferred from the SIP-server 2 to the location consumer 5 even in the case where at sending the SIP INVITE message, 36, no connection can be used between the SIP-server 2 and the mapping server 3 for acquiring the necessary routing and validation information. This way, delays in placing an emergency call with the required resolution of the physical location of the endpoint device 1 are avoided by storing the required routing and validation information in the SIP-server 2 based on the most recently acquired physical location on the endpoint 1 prior to an emergency call.

In FIG. 5, a signaling message comprising location information in form of a civic location 262, the signaling message being a SIP reREGISTER message 26 is shown. FIG. 5 shows an example of a PIDF-LO content of the SIP reREGISTER message 26 that defines a physical location of the endpoint device 1. The PIDF-LO content is shown as a body part of the SIP reREGISTER message 26, wherein only the parts of the SIP reREGISTER message 26 relevant to the conveyance of the physical location of the endpoint device 1 are depicted. Omitted parts are indicated in FIG. 5 as " . . . " (upper part of FIG. 5). The shown parts of the SIP reREGISTER message 26 form a standard part of an initial SIP REGISTER message being used for registering the endpoint device 1 at the SIP-server 2. The field "OS-0001232f59a8", 261, is a unique string required as a value part of a tuple ID that is defined by RFC4119. The physical location of the endpoint device 1 sending the SIP reREGISTER request message 26 is defined as being in Germany (DE), being in Munich, in the street "Hofmannstraße", number "51" on the first floor "FLR>1<" in "Room 100". The method value of "LLDP-MED", 263, is a registered method value by IANA being a valid value with respect to a method element defined by RFC4119. Furthermore, in FIG. 5 is depicted a timestamp value "2011-12-19T14:01:29Z", 264. The timestamp value 264 represents a standardized time in UTC format (Universal Time Coordinated) wherein the timestamp elements are defined in RFC4119. Instead of using a civic location 262 it is also possible for the SIP reREGISTER request message to comprise geospatial coordinates. Other signaling forms than using SIP are possible. The code shown in FIG. 5 may be part of a SIP INVITE message, which would require a multi-part body to distinguish the SDP (Session Description Protocol) body part from the PIDF-LO body part resulting in an introduction of additional code which is not part of the PIDF-LO conveyance of the physical location of the endpoint 1.

A technical feature or several technical features which has/have been disclosed with respect to a single or several embodiments discussed herein before, e.g. using a configuration source 8 for providing a location conveyance policy, may be pre-sent also in another embodiment, e.g. the one depicted in FIG. 1 or FIG. 2, respectively, replacing the SIP-server 2, except it is/they are specified not to be present or it is impossible for it/them to be present for technical reasons.

What is claimed is:

1. A method of conveying location information representing a physical location, the method comprising:
   acquiring by a first communication device a first location information and a second location information, the second location information being acquired subsequently to the acquiring of the first location information, the first communication device being an endpoint device having a processor and non-transitory memory;
   setting a time interval between acquiring the first location information and the second location information or a condition resulting in the change of the physical location of the first communication device by at least one location update trigger parameter of a location conveyance policy used by the first communication device, wherein the location update trigger parameter is selected from the group consisting of:
      a predetermined value of the time interval,
      a predetermined change of direction of the first communication device,
      a predetermined change in position of the first communication device, and
      a predetermined change of speed of the first communication device that is determined from a signaling load caused by at least one of sending the first signaling message and a resolution of the physical location of the first communication device;
   detecting by the first communication device a deviation of the second location information from the first location information representing a change of the physical location of the first communication device, and,
   triggered by the detected change of the physical location of the first communication device, the first communication device sending a first signaling message to a second communication device, the first signaling message comprising at least one of information identifying the deviation of the second location information from the first location information and information identifying the second location;
   triggered by the second communication device receiving the first signaling message, querying a mapping server by the second communication device to obtain routing information with respect to the second location information conveyed to the second communication device and to validate the second location information; and
   storing the queried routing information and validated second location information in non-transitory memory of the second communication device for use in routing of communications and/or providing location information in connection with communications involving the first communication device.

2. The method of claim 1, comprising:
   sending a second signaling message by the first communication device to the second communication device, wherein the second signaling message comprises no location information.

3. The method of claim 1, wherein the second communication device is a server.

4. The method of claim 3, wherein the first communication device is a Session Initiation Protocol (SIP) endpoint device, the server is a SIP-server, and the first signaling message is a SIP reREGISTER request.

5. The method of claim 1, wherein the first signaling message is a Session Initiation Protocol (SIP) reREGISTER request.

6. The method of claim 1, wherein the first signaling message is formed and sent such that a payload connection between the first and second communication devices is not formed.

7. The method of claim 1, comprising determining by the location conveyance policy when another location conveyance policy is to be acquired by the first communication device.

8. The method of claim 1, wherein the location conveyance policy comprises at least one specific form of transport carrying the first communication device, wherein at least one location update trigger parameter is allocated to the specific form of transport.

9. The method of claim 8, comprising acquiring the location conveyance policy by the first communication device by one of (i) configuration, wherein the first communication device is connected to an external configuration source and (ii) signaling, wherein the first signaling message is reused to acquire the location conveyance policy.

10. The method of claim 1, wherein the at least one location update trigger parameter is dependent on an item of information to predict a route and/or an estimated time of arrival, said item of information selected from the group consisting of:

a schedule of the user of the first communication device,
a timetable of the user of the first communication device,
a flight plan of the user of the first communication device,
a map indicating a route of the user of the first communication device,
a destination entered by the user of the first communication device into a navigation system,
an estimated time of arrival calculated by the navigation system upon entering a destination by the user of the first communication device,
an itinerary of the user of the first communication device, and
a calendar of the user of the first communication device.

11. The method of claim 1, wherein the at least one location update trigger parameter is specific to a form of location information, the form of the location information being one of: a civic location of the first communication device and geospatial coordinates of a physical location of the first communication device.

12. The method of claim 1, wherein the deviation of the second location information from the first location information of the first signaling message includes information indicating a direction by which the second location is physically located away from the first location.

13. The method of claim 12, wherein the deviation of the second location information from the first location information of the first signaling message also includes a speed.

14. The method of claim 13, wherein the deviation of the second location information from the first location information of the first signaling message also includes at least one of an area over which a device is traveling and an altitude.

15. A non-transitory computer readable medium having a computer program stored thereon, the computer program comprising executable code defines a method such that, when executed by a processor of a first communication device, the method is performed, the first communication device being an endpoint device having the processor and non-transitory memory; the method comprising:
    acquiring a first location information and a second location information, the second location information being acquired subsequently to the acquiring of the first location information,
    setting a time interval between acquiring the first location information and the second location information or a condition resulting in the change of the physical location of the first communication device by at least one location update trigger parameter of a location conveyance policy used by the first communication device, wherein the location update trigger parameter is selected from the group consisting of:
        a predetermined value of the time interval,
        a predetermined change of direction of the first communication device,
        a predetermined change in position of the first communication device, and
        a predetermined change of speed of the first communication device that is determined from a signaling load caused by at least one of sending the first signaling message and a resolution of the physical location of the first communication device;
    detecting a deviation of the second location information from the first location information representing a change of the physical location of the first communication device,
    triggered by the detected change of the physical location of the first communication device, sending a first signaling message to a second communication device, the first signaling message comprising at least one of information identifying the deviation of the second location information from the first location information and information identifying the second location to trigger the second communication device to query a mapping server to obtain routing information with respect to the second location information to validate the second location information and store the queried routing information and validated second location information for use in routing of communications and/or providing location information in connection with communications involving the first communication device; and
    wherein the second communication device is a server.

16. A communication apparatus comprising:
    a first communication device, the first communication device having a processor and a non-transitory computer readable medium, the first communication device to perform a method comprising:
    acquiring by a first communication device a first location information and a second location information, the second location information being acquired subsequently to the acquiring of the first location information, the first communication device being an endpoint device having a processor and non-transitory memory;
    setting a time interval between acquiring the first location information and the second location information or a condition resulting in the change of the physical location of the first communication device by at least one location update trigger parameter of a location conveyance policy used by the first communication device, wherein the location update trigger parameter is selected from the group consisting of:
        a predetermined value of the time interval,
        a predetermined change of direction of the first communication device,
        a predetermined change in position of the first communication device, and
        a predetermined change of speed of the first communication device that is determined from a signaling load caused by at least one of sending the first signaling message and a resolution of the physical location of the first communication device;
    detecting by the first communication device a deviation of the second location information from the first location information representing a change of the physical location of the first communication device, and,
    triggered by the detected change of the physical location of the first communication device, the first communication device sending a first signaling message to a second communication device, the first signaling message comprising at least one of information identifying the deviation of the second location information from the first location information and information identifying the second location to trigger the second communication device to query a mapping server to obtain routing information with respect to the second location information to validate the second location information and store the queried routing information and validated second location information for use in routing of communications and/or providing location information in connection with communications involving the first communication device.

17. The communication apparatus of claim 16, also comprising:
    the second communication device, the second communication device being communicatively connectable to the first communication device, the second communication device to query the mapping server to obtain routing information with respect to the second location information conveyed to the second communication device and to validate the second location information in response to receiving the first signaling message and store the queried routing information and validated second location information in non-transitory memory of the second communication device.

18. The communication apparatus of claim 17, wherein the second communication device is a server.

19. The communication apparatus of claim 18, wherein the first communication device is a Session Initiation Protocol (SIP) device and the second communication device is an SIP server.

20. The communication apparatus of claim 16, wherein the first signaling message is a Session Initiation Protocol (SIP) reREGISTER request; and wherein the communication apparatus is a communication system that also comprises the mapping server, the mapping server being communicatively connectable to the second communication device, the mapping server configured to respond to the query from the second communication device to provide routing information with respect to the second location information and to validate the second location information.

* * * * *